United States Patent [19]

Watanabe

[11] Patent Number: 5,717,776
[45] Date of Patent: Feb. 10, 1998

[54] CERTIFICATION CARD PRODUCING APPARATUS AND CERTIFICATION CARD

[75] Inventor: Yoshihiro Watanabe, Fujisawa, Japan

[73] Assignee: Kabushiki Kaisha Toshiba, Kawasaki, Japan

[21] Appl. No.: 411,874

[22] Filed: Mar. 28, 1995

[30] Foreign Application Priority Data

Mar. 30, 1994 [JP] Japan ................ 6-060609

[51] Int. Cl.$^6$ .................................................. G06K 9/00
[52] U.S. Cl. .................... 382/116; 382/117; 235/380; 351/237
[58] Field of Search ............... 382/115–119; 235/380, 235/382, 384; 351/237, 239; 380/23, 54; 283/77, 112, 23

[56] References Cited

U.S. PATENT DOCUMENTS

| | | | |
|---|---|---|---|
| 4,843,377 | 6/1989 | Fuller et al. | 382/117 |
| 4,855,583 | 8/1989 | Fraser et al. | 235/492 |
| 5,224,173 | 6/1993 | Kuhns et al. | 382/116 |
| 5,259,025 | 11/1993 | Monroe et al. | 382/115 |
| 5,355,411 | 10/1994 | MacDonald | 382/119 |
| 5,513,272 | 4/1996 | Bogosian | 382/116 |

FOREIGN PATENT DOCUMENTS

| | | |
|---|---|---|
| 2-1353 | 1/1990 | Japan . |
| 2-99066 | 4/1990 | Japan . |
| 2-311982 | 12/1990 | Japan . |
| 3-149662 | 6/1991 | Japan . |
| 5-73580 | 3/1993 | Japan . |

*Primary Examiner*—Leo Boudreau
*Assistant Examiner*—Chris Kelley
*Attorney, Agent, or Firm*—Cushman Darby & Cushman IP Group of Pillsbury; Madison & Sutro, LLP

[57] ABSTRACT

An apparatus comprises a print section for printing a face image and characters on a first card medium, a check section for checking on whether the first card medium is defective or not, an integration section for integrating the first card medium with a second card medium with an IC memory to produce a certificate card only when the print of the first card medium is acceptable, and a write section for writing at least the data corresponding to the face image and characters into the memory section of the second card medium. The apparatus further comprises an automatic reception section containing a retina image photoing unit and an eyesight test unit, wherein an retina image of the owner of the card is photoed, while he or she is having an eyesight tested, thereby identifying the owner.

12 Claims, 14 Drawing Sheets

FIG. 2

FAMILY REGISTER NATIONALITY

| NAME/BIRTH DATE | HANAKO TOSHIBA | JULY 1, 1957 |
|---|---|---|
| ADDRESS | 1-1-1 SHIBAURA MINATO-KU TOKYO | |
| | 70 YANAGI-CHO SAIWAI-KU KAWASAKI-SHI | |
| ISSUE DATE | FEB. 24, 1989, 0001 | |
| | VALID UNTIL BIRTHDAY IN 1992 | |
| CONDITIONS OF LICENSE | | |
| GLASSES DRIVING OF MOTORCYCLE IS LIMITED TO MEDIUMSRE | | |
| LICENSE NO. | NO. 9490999999909 | |
| CLASS 1 BIKE | FEB. 24, 1989 | |
| OTHERS | FEB. 24, 1989 | |
| CLASS 2 | — — | |

DRIVER'S LICENSE

| VALIDITY | 0 | 1 | 0 | 1 | 0 | 0 | 0 | 0 | 0 | 0 | 0 |
|---|---|---|---|---|---|---|---|---|---|---|---|
| TYPE OF LICENSE | 大型 | 普通 | 大特 | 二 | 小型 | 原付 | 大型二 | 普通二 | 大特二 | けん引 | けん引二 |

ISSUE DATE

F I G. 9A

CERTIFICATION CARD PRODUCING APPARATUS AND CERTIFICATION CARD

BACKGROUND OF THE INVENTION

1. Field of the Invention

This invention relates to a certification card with an identification photo, such as a driver's license or a personal identification card or ID card, and a certification card producing apparatus for producing such a certification card.

2. Description of the Related Art

At present, for certificates with full-colored identification photos, particularly driver's licenses, human intervention is required almost from the acceptance of applications to the delivery of licenses. Since fifteen million people visit each driving test ground every year to renew their licenses every three years, such places are very crowded.

To improve the situation, an attempt to automate part of the work in those places has been made recently. For example, proposals for such automation have been disclosed in Jpn. Pat. Appln. KOKAI Publication No. 2-1353, Jpn. Pat. Appln. KOKAI Publication No. 2-311982, Jpn. Pat. Appln. KOKAI Publication No. 3-149662, and Jpn. Pat. Appln. KOKAI Publication No. 5-73580.

Those proposals, however, relate to automation of a very small part of the entire system or provision for preventing double issuing. As compared with a fully automated system such as an automated teller machine in a bank recently improved remarkably, it is safe to say that the above-mentioned proposals are far inferior in terms of degree of automation.

The reason for this is that human intervention is required for such things as an aptitude test for driving, an eyesight test, identification, confirmation of data entered into a host computer, a check on whether or not renewal is permitted according to a history of violation, and a course needed to be taken at renewal. Therefore, people who are going to renew their driver's licenses will suffer the following inconveniences:

(1) Since there are only one or two places where people can renew their driver's licenses on the same day, they have to take a day off and spend more than half a day on renewal.

(2) Therefore, early in the morning and the afternoon, crowds of people rush to the places. Because rush hour is short, increasing manpower will create idle time, resulting in lower efficiency and higher cost. Thus, manpower cannot be increased and consequently a lot of people line up to wait for their turn.

(3) During the peak hours, careless photography may be carried out, possibly producing photographs inappropriate for driver's licenses, such as identification photos with closed eyes.

(4) To secure a space for people to line up, a large space is needed for each section. Renewers must move a long distance from section to section. Each time they change the sections, they must line up again.

(5) Since the individual sections are located some distance apart from each other, every time each section accepts applications, they have to check old driver's licenses, applications, and identifications, contributing to a long line of people waiting for their turns.

There might be a mistake slipping through the respective sections, and found at the last moment when the driver's license is delivered. In this case, the license must be made again, possibly making the renewer wait for a long time.

Also in such a case, when the renewer has asked that the new driver's license be delivered by mail and the renewer has returned home, making the license again requires complicated procedures including telephoning to ask the renewer to visit the section again.

(6) Because identification photos are not electronically filed, if an old driver's license were lost, it would be impossible to identify the renewer unless the previous application form with his or her identification photo is fetched from the shelf. Therefore, it would take more time to issue the license.

(7) Since information on the renewer's administrative disposition (e.g., a history of violations and accidents) or the contents of the driver's license are all entered into the host-computer, a drivers license cannot be issued unless registration data is entered on-line. Therefore, should the host computer go down, people cannot renew their driver's licenses and must come again even if they manage to take a day off for renewal. Alternatively, driver's licenses could be made by producing the identification photos from the photographs stuck to the application forms by indirect photography.

(8) Since a stamp for the registration fee is put on the application form after the computer has printed on the mount, it is impossible to continue the process using another application form, even if a mistake is found in the contents of the application form in the course of creating the license. If this should happen, a white paper sheet must be stuck on the mount and printing must be done again, requiring a lot of time and labor.

SUMMARY OF THE INVENTION

The objects of the present invention are to provide a highly reliable certification card which is best suited for, for example, a drivers license, enables automated license renewal, and improves the convenience to the owner of a driver's license, and a certification card producing apparatus for producing such certification cards.

In order to achieve the above objects, according to the present invention, there is provided a card issuing apparatus which is connected to a host unit and issues cards, the card issuing apparatus comprises means for administering an aptitude test for an applicant; photographing means for photographing an image of the applicant; means for inputting identification data items about the applicant; means for receiving data items about the applicant to be written on a first card from the host unit on the basis of the identification data items inputted from the input means; and means for printing on the first card the image of the applicant photographed by the photographing means and the data items about the applicant to be written on the first card received from the host unit.

With the certification card producing apparatus of the present invention, after a first card medium has been formed, the first card medium is integrated with a second card medium and thereafter data is written into an IC memory of the second card medium. Consequently, a high temperature and strong ultraviolet rays for forming the first card medium can be prevented from having an adverse effect on the second card medium. As a result, it is possible to form a highly reliable certification card with a clear identification photo and covered with a good protective film.

The first card medium is checked for defects before it is integrated with the second card medium. If it is defective, integration is not effected, preventing the expensive second card medium from being wasted.

Furthermore, while the renewer is having an eyesight test, the renewer's retina is also photographed at the same time. Accordingly, identification is automatically carried out with ease on the basis of the retina image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 9A and 9B are exploded plan views of the structure of the license; and

DETAILED DESCRIPTION OF THE PREFERRED EMBODIMENTS

Hereinafter, referring to the accompanying drawings, an embodiment of the present invention will be explained.

Figure 1:
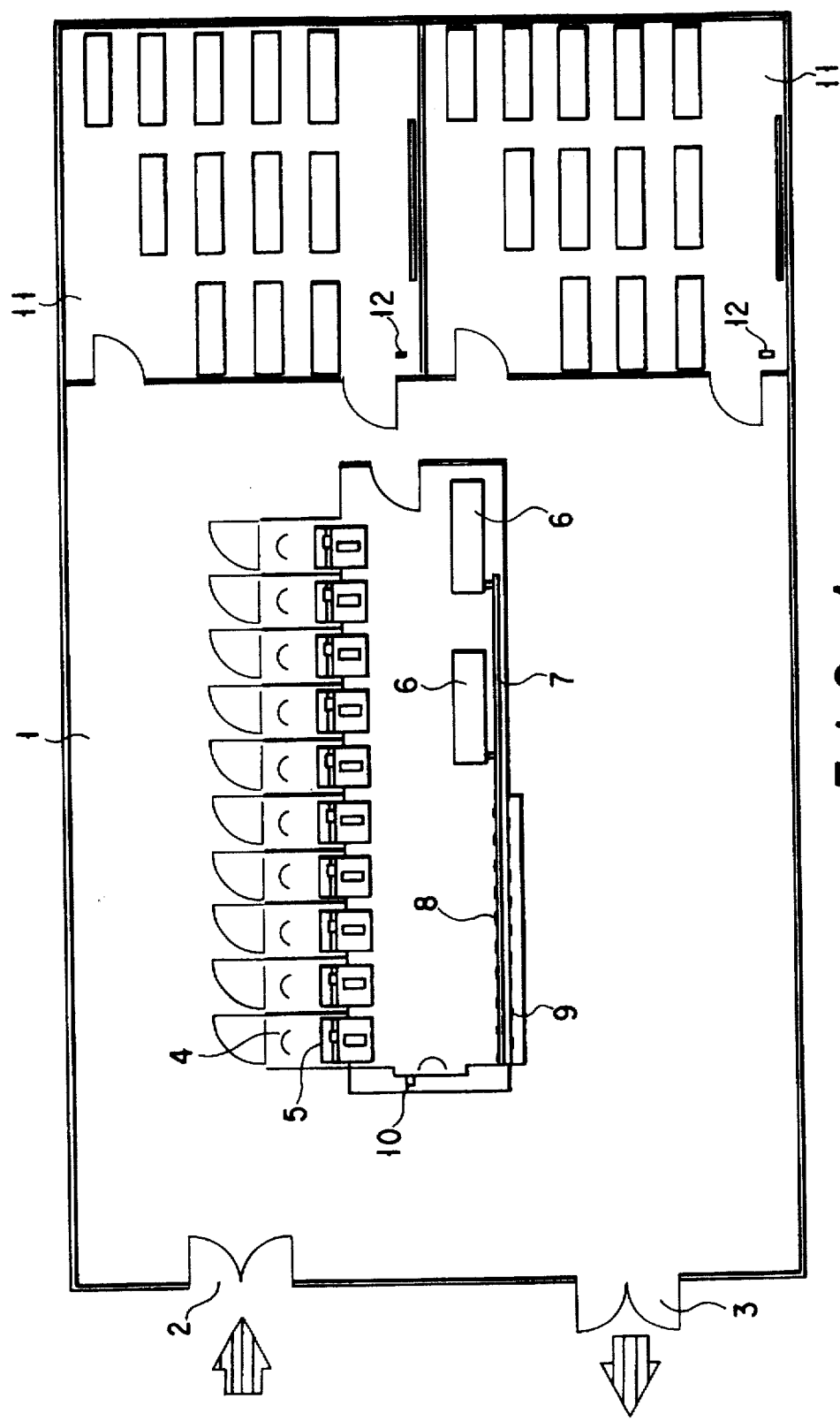
FIG. 1 is a schematic diagram of the layout of automatic renewal facilities for driver's licenses.

FIG. 1 is a schematic diagram of the layout of automatic renewal facilities for driver's licenses, for example. In FIG. 1, numeral 1 indicates a renewal room, which is provided with an entrance 2 and an exit 3. In the renewal room 1, there are provided a plurality of reception boxes 4, . . . for renewers (users) in parallel. These reception boxes 4 are provided with automatic reception apparatuses 5 on a one-to-one basis. The renewal room 1 is also provided with a license producing apparatus 6 for producing licenses with radio IC cards, a slit conveyer 7 for transporting the licenses produced at the license producing apparatus 6, a license receiving apparatus 9 containing a pickup unit 8 for picking up a specific-numbered license from the slit conveyer 7, and a reference entry terminal unit 10 for changing the contents of the license.

Numeral 11 indicate lecture rooms where renewers take courses, and consist of a simplified-lecture room and a fail-lecture room. In the lecture rooms, there are provided license number read/print apparatuses 12 for printing "Finished" on licenses and writing in the ICs data indicating that the renewer has taken the course.

The automatic reception apparatuses 5, which are operated directly by renewers, perform processes in an interactive manner. For many people to be able to use them, ten reception apparatuses 5 are provided. The renewal operation is completed in about one minute when the renewer is accustomed to it. Even if this is the first time a person renews the driver's license, it will take only three minutes or so. The automatic reception apparatus 5 has a hearing test in the course of a renewal operation, and is partitioned by the reception box 4. The partition by the reception box 4, however, may be eliminated, because in the actual test facilities, if the renewer has an ordinary conversation with the examiner and makes a reasonable answer, he or she will be accepted.

Figure 2:
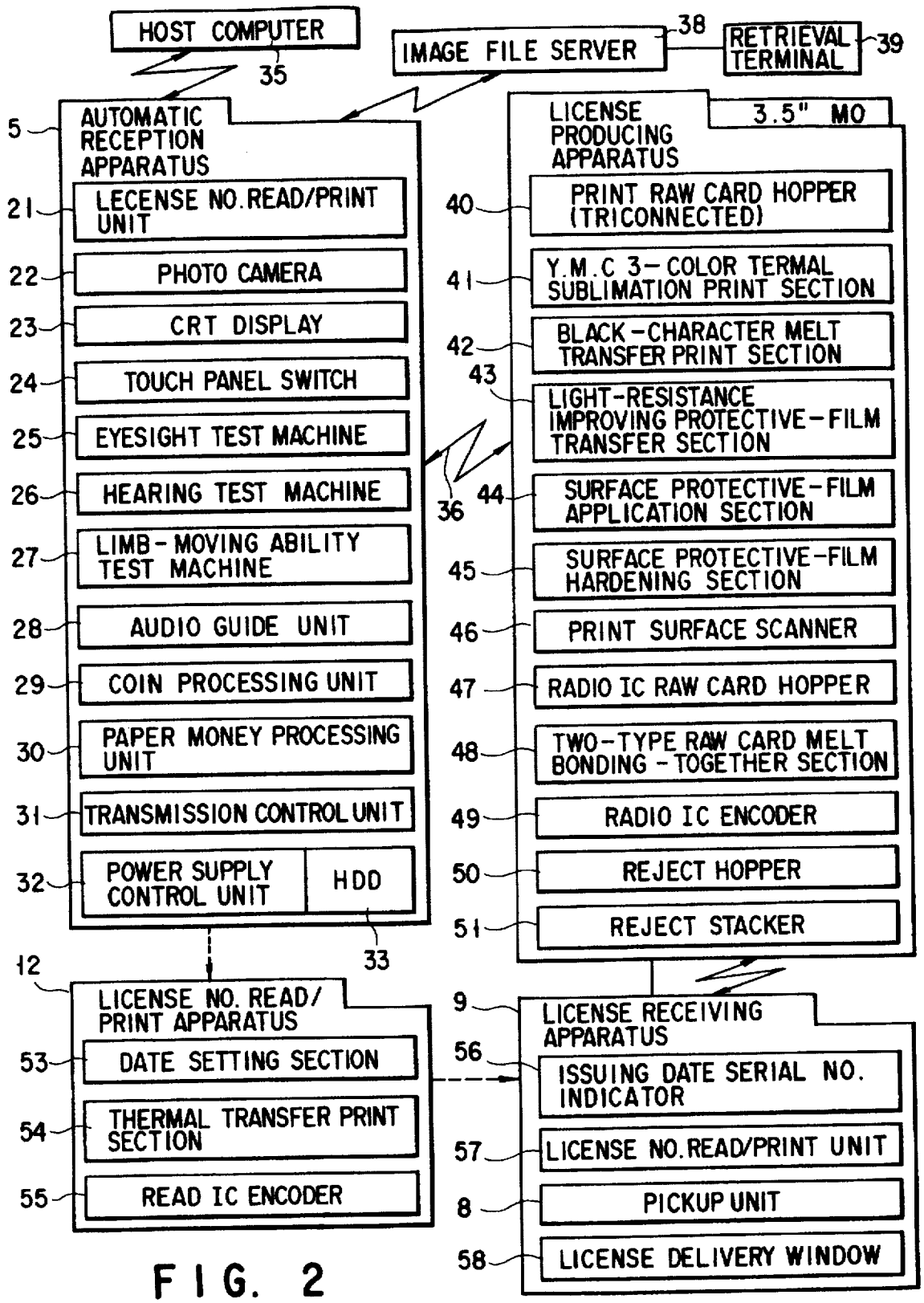
FIG. 2 is a block diagram of a driver's license automatic renewal system according to an embodiment of the present invention.

FIG. 2 shows the structure of a driver's license automatic renewal system (or certification card producing apparatus) for automatically renewing driver's licenses (or certification cards) according to the present invention. In the figure, the automatic reception apparatus 5 comprises a license number read/print unit 21, a photographic camera 22, a color CRT display 23, a touch panel switch 24, an eyesight test machine 25, a hearing test machine 26, a limb-moving ability test machine, an audio guide unit 28, a coin processing unit 29, a paper money processing unit 30, a transmission control unit 31, a power supply control unit 32, and a hard disk unit 33 for storing created license data.

The automatic reception apparatus 5 is connected to a host computer 34 in which data on renewers is entered, through a communication line 35, and updates the necessary data via the transmission control unit 31. The written data and identification photo data of the driver's license renewed at the automatic reception apparatus 5 are sent via a LAN channel 36 to the license producing apparatus 6, which prints on the surface of the license and writes the necessary data into an IC memory.

The written data and identification photo data of the license obtained at the automatic reception apparatus 5 are transmitted via a LAN channel 37 to an image file server (e.g., an optical disk unit), in which these data items are stored. Connected to the image file server 38 is a retrieval terminal unit 39, which makes it possible to retrieve and output the data in the image file server 38 when necessary.

The license producing apparatus 6 comprises a print raw card hopper 40, a Y, M, C, 3-color thermal sublimation print section 41, a black-character melt transfer print section 42, a light-resistance-improving protective-film transfer section 43, a surface protective-film application section 44, a surface protective-film hardening section 45, a print surface scanner 47, a radio IC raw card hopper 47, a two-type raw card melt bonding-together section 48, a radio IC encoder 49, a reject hopper 50, a reject stacker 51, and a magneto-optical disk unit 52, not shown in FIG. 2.

After reception at the automatic reception apparatus 5, the necessary items are written into the old driver's license, which is then returned to the owner. After the renewer has taken a course in the lecture room 11, the license number read/print section 12, which has almost the same construction as that of the license number read/print unit 21 contained in the automatic reception apparatus 5, writes data indicating "Finished" in the old license and puts a seal thereto.

The license number read/print apparatus 12—comprises a date setting section 53, a thermal transfer print section 54, and a radio IC encoder 55.

The old driver's license in which data indicating that the course has been taken is written and to which the seal is put at the license number read/print apparatus 12 is inserted into the license number read/print unit in the license receiving apparatus 9. The corresponding new license created at the license producing apparatus 6 during the lecture and stored in the slit conveyer 7, is picked up by the pickup unit 8, which releases it to a window (a delivery window). The old license is written in with data indicating "Renewed and Invalid" and put with the seal, and then collected.

The license receiving apparatus 9 is made up of an issuing date serial-number indicator 56 installed on the ceiling of the renewal room 1, a license number read/print unit 57, the pickup unit 8, and a new-license delivery window 58.

Figure 3:
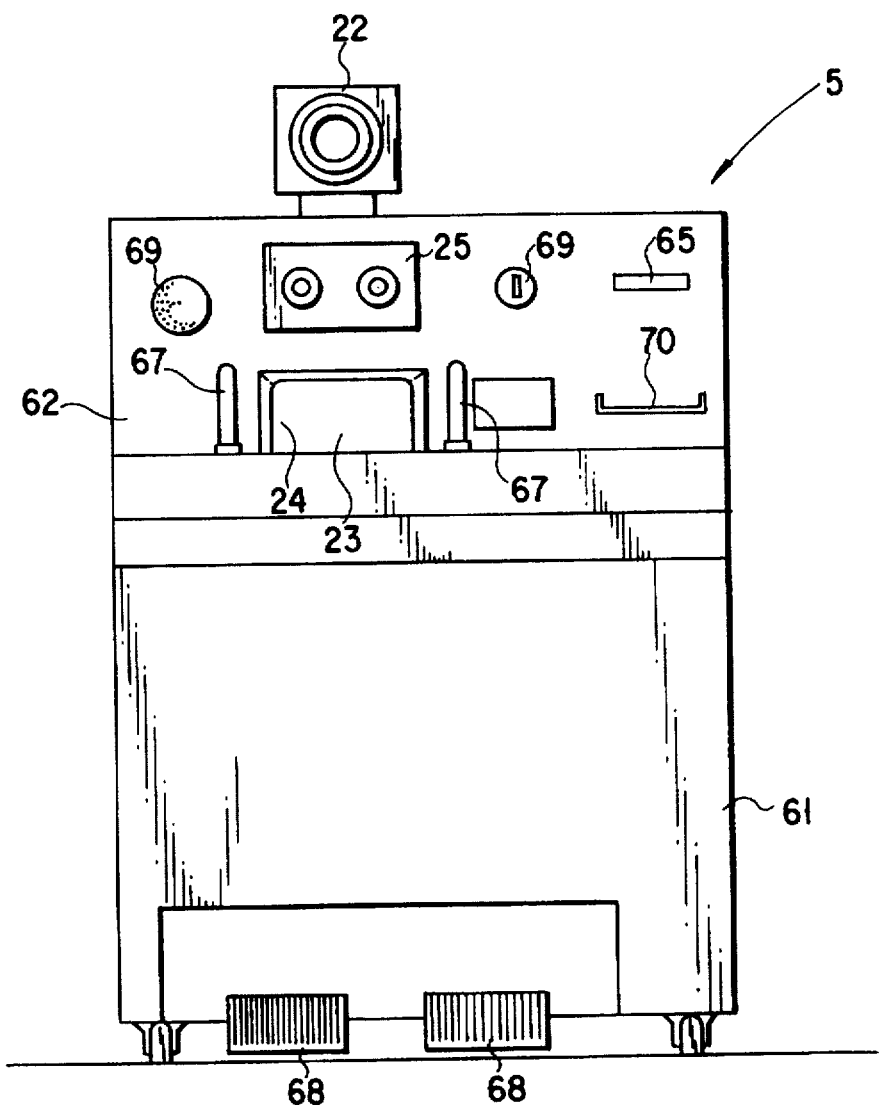
FIG. 3 is a front view of an outward appearance of an automatic reception apparatus.
Figure 4:
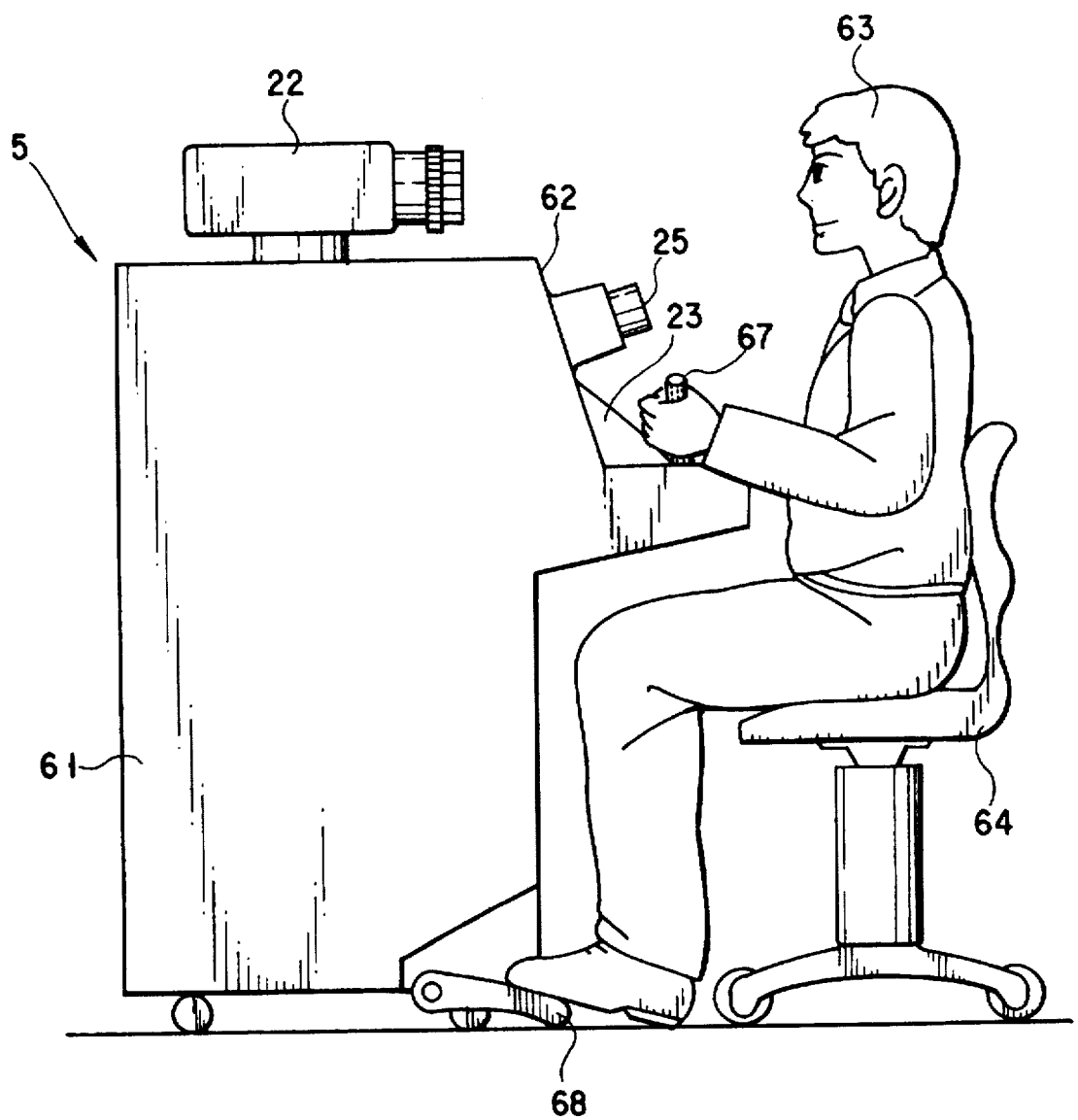
FIG. 4 is a side view of an outward appearance of the automatic reception apparatus.

FIGS. 3 and 4 show the appearance of the automatic reception apparatus 5. In the figure, numeral 61 indicates the apparatus body, in the front of which a reception face 62 is formed. The reception face 62 can be operated with the renewer 63 sitting on the chair 64. On the top of the body 61, the photographic camera 22 is installed. Its field of vision is set so as to take a picture of the face of the renewer sitting on the chair 64. The photographic camera 22 contains 410000-pixel CCD image sensing elements of, for example, the R (red), G (green), B(blue), 3-plate type.

On the reception face 62, there are provided a license insert slot 65 coupled with the license number read/print unit 21, and a color CRT display 23. The CRT display 23 serves as both a monitor display for the photographic camera 22 and an operation guide display. On its screen, a transparent touch panel switch 24 is installed.

The reception face 62 is further provided with the eyesight test machine 25 for testing the eyesight of the renewer, and a speaker 66 that functions as a microphone for collecting the speech of the renewer. The speaker 66 is connected to the hearing test machine 26 for testing the hearing ability of the renewer and is used not only to output the speech from the audio guide unit 28 but also to serve as a microphone for collecting the speech of the renewer. The hearing test machine 26 contains a speech response unit for analyzing the contents of the speech collected by the speaker 66. The eyesight test machine 25 also has a retina photoing function explained later and a deep eyesight test function.

In the lower part of the body 61, there are provided a lever 67 and pedal 68 coupled with the limb-moving ability test machine 27 for testing the moving and functional ability of the renewer's arms and legs. In response to the instructions appearing on the CRT display 23, the renewer can have his or her arms and legs tested by shifting the lever 67 with his or her right or left hand and stamping on the pedal 68 with his or her right or left foot.

The reception face 62 further has a coin slot 69 and a paper money slot 70 in it. The coin slot 69 is connected to the recycling-type coin processing unit 29 capable of receiving and paying four types of coins. The paper money slot 70 is connected to the recycling-type paper money processing unit 30 capable of receiving and paying three types of paper money.

Figure 5:
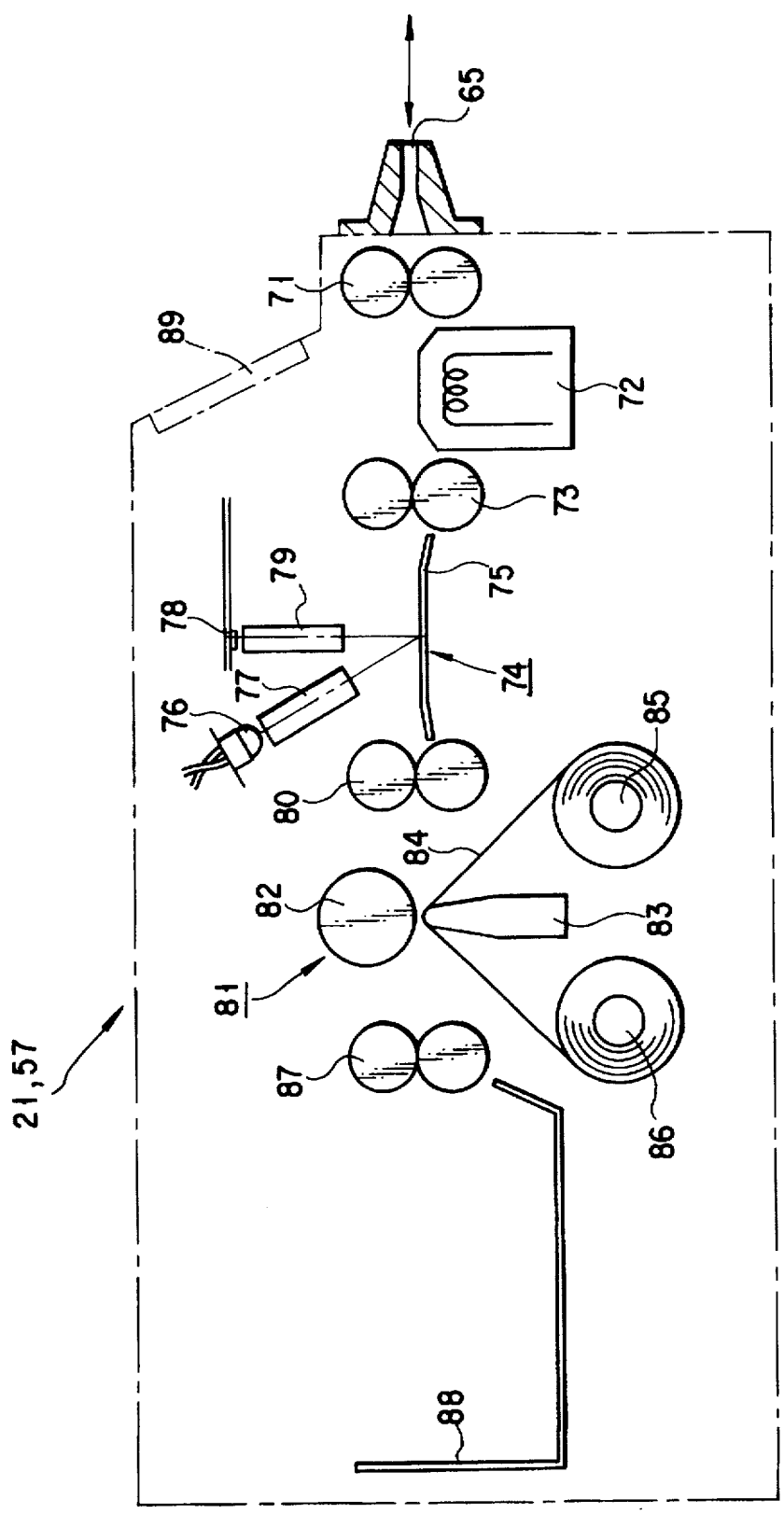
FIG. 5 is a schematic side view of a license number read/print unit.

FIG. 5 schematically shows the structure of the license number read/print unit 21. In the figure, when a driver's license is inserted into the license insert slot 65, a sensor (not shown) senses the insertion, which causes a motor (not shown) to start, rotating a pinch roller 71 to take in the license. The received license passes over a radio IC encoder 72 and is sent to transport rollers 73. The radio IC encoder 72 writes and reads data, by radio, into and from the IC memory in the license passing there.

The license conveyed by the transport rollers 73 is sent to a license number read section 74. The license number read section 74 optically reads the license number printed in the OCR-B font on the license passing there. The license number read section 74 comprises a lower face guide plate 75 for supporting a conveyed driver's license, an LED array 76 for illumination, a lens 77 for converting the rays of light from the LED array 76 into parallel rays of light and projecting them onto the surface of the license, a contact sensor 78 for performing photoelectric conversion of the reflected light from the surface of the license, and a lens 79 for focusing the reflected light from the license's surface onto the light-receiving face of the contact sensor 78.

The license passed through the license number read section 74 is conveyed by transport rollers 80 to a thermal transfer print section 81. The thermal transfer print section 81 prints the necessary data items, including "Finished", on the surface of the driver's license passing there. The transfer print section is composed of a print platen roller 82, a thermal transfer print head 83, a supply shaft 85 of a thermal transfer ribbon 84, and a take-up shaft 86 of the thermal transfer ribbon 84.

The license passed through the thermal transfer print section 81 is sent by transport rollers 87 to a collect hopper 88, which stores it. Numeral 89 is an indicator unit, which is installed when the unit is used independently.

Figure 6:
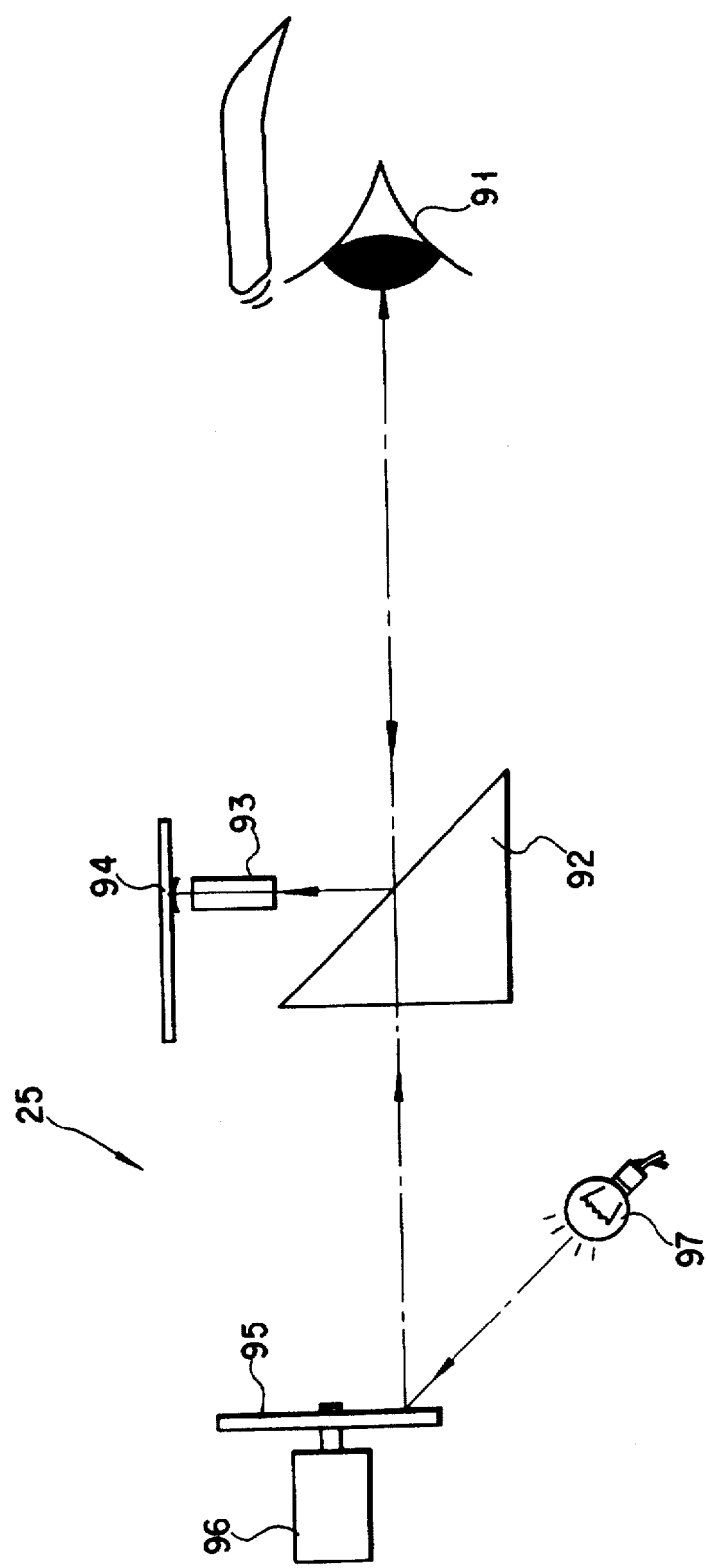
FIG. 6 is a schematic diagram of an eyesight test machine.

FIG. 6 schematically shows the structure of the eyesight test machine 25, which also has a retina photoing function as mentioned earlier. In the figure, numeral 91 indicates an eyeball of the renewer, 92 a prism, 93 a onefold lens, 94 a contact sensor, 95 a risk with an eye-test chart, 96 a stepping motor for rotating the disk 95, and 97 an illumination lamp for illuminating the eye-test chart on the disk 95. In the eye-test chart 95, eye-test marks of different sizes with circular patterns partially cut away are arranged in the order of size. The eye-test chart 95 is rotated by the stepping motor 97 on the basis of random numbers, thereby allowing eye-test marks to be shown to the renewer at random. The renewer answers the displayed mark, saying "Up", "Down", "Right", or "Left".

During the eyesight test, the light from the illumination lamp 97 is reflected from the disk 95, passes through the prism 92, and illuminates the eyeball 91 of the renewer. The reflected light from the eyeball 91 is reflected from the prism 92, passes through the onefold lens 93, and focuses on the contact sensor 94. Therefore, while the renewer is aware of having only an eyesight test, the retina is scanned by the contact sensor 94 several times and converted photoelectrically, thereby producing a retina image of the renewer.

Figure 7:
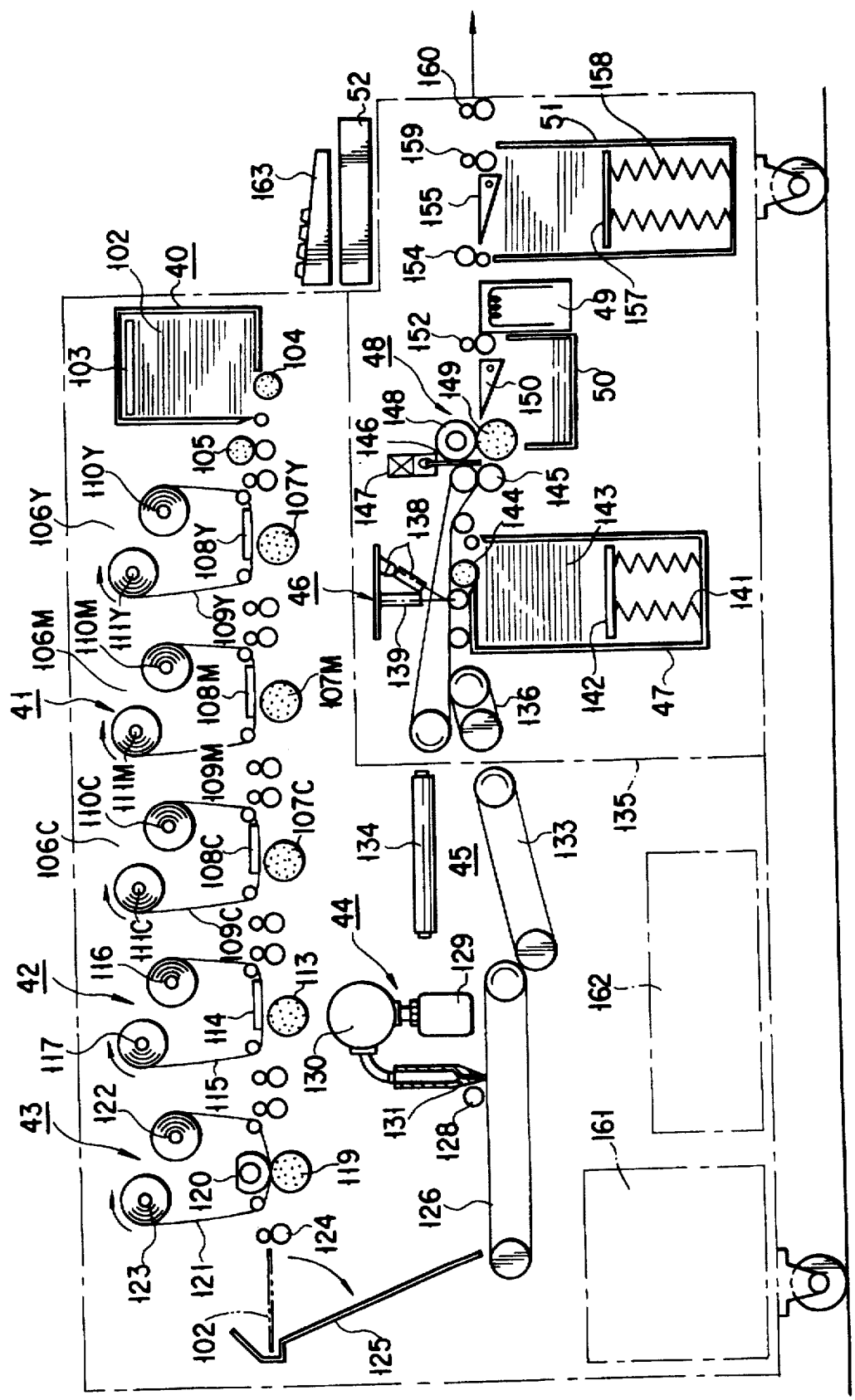
FIG. 7 is a schematic side view of the mechanical structure of a license producing apparatus.

FIG. 7 schematically shows the construction of the license producing apparatus 6. In the figure, in the print raw card hopper 40, a large number of print raw cards 102 are stacked with their surface upward or in a horizontal position. In the future, three types of driver's license distinguished by bands of three different colors are scheduled to be issued on the basis of the renewer's violation and accident history. To achieve this, three hoppers housing print raw cards 102 (not shown) are provided in the print raw card hopper 40 so as to be movable in the vertical direction. After the corresponding hopper has been moved to the take-out position, the print raw cards 102 are taken out. In the print raw card hopper 40, there is provided a weight 103 for pressing the housed print raw cards 102 downward.

Thermal sublimation printing is effected on the image-forming layer at the surface of the print raw card 102. Since if dust adheres to the surface, a blank will occur there and the print will be defective, a bundle of print raw cards 102 is packed with the bottom surface sealed so as to prevent dust from adhering. When placed in the print raw card hopper 40, the bundle of the print raw cards 102 packed is taken out after its seal on the bottom surface has been broken.

The print raw cards 102 in the print raw card hopper 40 are taken out one by one from the lowest end of the hopper by a rubber take-out roller 104 that rotates in a counter-clockwise direction. To prevent overlapping cards from being taken out, a mechanism (not shown) called a throat knife for keeping a space thinner than the thickness of the card is provided on the front wall of the hopper.

The print raw card 102 taken out by the rubber roller 104 is sent to an adhesive roller 105. When dust has adhered to the surface of the print raw card 102 due to contact of the throat knife with the print raw card 102 during the taking out, the adhesive roller 105 causes the dust to adhere to its adhesive layer, cleaning the surface of the print raw card 102.

The print raw card 102 passed through the adhesive roller 105 is sent to the 3-color thermal sublimation print section 41. The thermal sublimation print section 41 prints an identification photo of the renewer taken at the automatic reception apparatus 5 on the print raw card 102 in full color. The print section is composed of a Y (yellow) print section 106Y, an M (magenta) print section 106M, and a C (cyan) print section 106C, and effects thermal sublimation printing by superimposing these three colors of Y, M, and C as required.

The print sections 106Y, 106M, and 106C comprises platen rollers 107Y, 107M, 107C, thermal print heads 10BY, 108M, 108C, Y, M, C thermal sublimation print ink ribbons 109Y, 109M, 109C, ink ribbon supply shafts 110Y, 110M, 110C and ink ribbon take-up shafts 111Y, 111M, 111C, respectively. The platen rollers 107Y, 107M, 107C are formed of soft rubber rollers or ceramic powder-embedded rollers to minimize the slip with the print raw card 102.

To print the written data in letters, following the identification photo, black thermal melt transfer printing is effected. Generally, thermal melt transfer print requires lower applied energy than sublimation print, and therefore enables high-speed transport. In character printing whose pit area (the length in the longitudinal direction) is greater than that of the identification photo, melt transfer printing is desirable.

Then, the print raw card 102 on which the identification photo has been printed at the 3-color thermal sublimation print section 41 is sent to the black-letter melt transfer print section 42, which prints black letters at high speeds. The black-letter melt transfer print section 42 comprises a platen roller 113, a thermal print head 114, a black thermal melt transfer ink ribbon 115, an ink ribbon supply shaft 116, and an ink ribbon take-up shaft 117.

The print raw card 102 on which the written data has been printed at the black-letter melt transfer print section 42 is sent to the light-resistance-improving protective-film transfer section 43, which performs melt transfer of ultraviolet CUV) protective films. This is done to prevent the sublimation-printed identification photo from fading, because an ultraviolet (UV) hardening surface protective film is applied in a subsequent stage and ultraviolet rays are projected on the film. The UV protective film displays an indispensable function in preventing discoloration when exposed in the sunlight under actual use conditions.

The UV protective film is transparent and formed on the transfer paper ribbon as with a thermal print ink ribbon. A pinch roller in which a heat-generating element is embedded is pressed against the print raw card 102 to perform thermal transfer. Although a thermal print head may be used for transfer, use of a lower-priced heat roller is better, because transfer is performed on the entire surface. The light-resistance-improving protective transfer section 43 performs melt transfer of a UV protective film as described above, and comprises a platen roller 119, a heat roller 120, a UV protective-film melt transfer ribbon 121, a ribbon supply shaft 122, and a ribbon take-up shaft 123. If the heat roller 120 had a vertically movable structure, it would cost much. Therefore, to lower the cost, part of the roller is cut away to separate away from the platen roller 119, thereby achieving the function. Actually, this approach is often used.

The print raw card 102 on which a UV protective film has undergone melt transfer at the light-resistance-improving protective-film transfer section 43, is conveyed by a clamp roller 124. When the leading edge of the card hits a stopper-cam-chute 125, the trailing edge of the print raw card 102 will come off the clamp roller 124, turn right, and go down along the stopper-cam-chute 125. On the plane where the card falls, there is provided a horizontal belt conveyer 126, which receives the fallen print raw card 102 and conveys it to the right, while correcting the disordered position of the fallen card with an alignment guide (not shown), until the card reaches the surface protective-film application section 44.

The surface protective-film application section 44 applies a UV hardening liquid to the surface of the print raw card 102 and comprises a pinch roller 128, a UV hardening liquid tank 129, a fixed-quantity supplier 130, and an application pen 131. Specifically, the print raw card 102 transported by the belt conveyer 126 is pressed firmly by the pinch roller 128 against the belt conveyer 126, and then the fixed-quantity supplier 130 absorbs a fixed quantity of UV hardening liquid from the UV hardening liquid tank 129. Thereafter, the card is sent to the application pen 131, which applies UV hardening liquid thinly all over the print raw card 102, making use of capillary action. Since the UV hardening liquid, once hardened, has a very hard surface, its surface is less liable to be scratched than an ordinary overcoat layer, thereby improving the durability remarkably.

The print raw card 102 applied with UV hardening liquid at the surface protective-film application section 44 is sent to the surface protective-film hardening section 45. The surface protective-film hardening section 45 hardens the UV hardening liquid applied to the print raw card 102, and is composed of a belt conveyer 133 and a mercury lamp 134 placed nearly 10 cm above this conveyer. Specifically, the print raw card 102 transported by the belt conveyer 126 is delivered to the belt conveyer 133, which then transports it. By projecting ultraviolet rays from the mercury lamp 134 on the surface of the print raw card 102 transported over the belt conveyer 133, the UV hardening liquid applied to the surface of the print raw card 102 is hardened rapidly.

The UV hardening liquid is widely used because of its easy-to-treat property such that it never hardens by radiation of rays other than ultraviolet rays and, once radiated with ultraviolet rays, hardens rapidly in a short time. However, it has a disadvantage in that because the liquid is applied to only one face, this permits the hardening to cause strain, which warps the card on the whole. Since the substrate of the print raw card 102 is formed of plastic resin (PET), a substrate of 0.7 mm or more thick is strong enough to suppress such a warp. With such a print raw card 102, the overall thickness cannot be 0.76 mm, as determined by the ISO standards, unless the print substrate is made as thin as nearly 0.15 mm. Therefore, in the surface protective-film hardening section 45, only the surface is hardened to the extent that the surface is lightly sticky with the inside remaining in a liquid state. In this state, the substrate is conveyed to the next stage, thereby preventing the thin print raw card 102 from warping.

In this case, unlike an ordinary initiator, the photopolymerization initiator contained in the UV hardening liquid must be of such a type as once it has started hardening, the action continues even if the radiation of ultraviolet rays is stopped. It is convenient if the composition is prepared so as to harden such a type completely in several minutes.

The print raw card 102 whose surface is lightly hardened at the surface protective-film hardening section 45 is sent to a radio IC adapter unit 135. If ordinary driver's licenses with identification photos are to be obtained without using radio ICs, a stacker may be provided here to collect them.

In the radio IC adapter unit 135, the print raw card 102 transported by the belt conveyer 133 in the surface protective-film hardening section 45 is delivered to a transport path 136, which conveys it to the print surface scanner 46. The print surface scanner 46 comprises an illumination unit 138 made up of an LED array for illuminating the surface of the print raw card 102 and a lens, and a photoing unit 139 made up of a contact sensor for receiving the reflected light from the surface of the print raw card 102 and converting it into an electric signal, and a lens.

The printed surface consists of the specific written items and identification photo. Only the license number is written in OCR characters. Therefore, by placing an OCR reader (the print surface scanner 46) in this place, it is possible to read the license number and determine what type or driver's license it is.

In the case of ordinary automatic printing machines (e.g., bankbook printers), although every printing machine has the function of verifying the magnetically recorded important items, they only have such a simple function as sensing print density to verify printed characters or images. The reason for this is that magnetic reading can be done by a magnetic head, which is a low-priced component, whereas the reading of printed images is done by an image scanner, which is an expensive component, and its verification mechanism is complex.

With this embodiment, however, since the characters and identification photo data on the card surface are transmitted from the automatic reception apparatus 5, and images are printed on the card according to the transmitted data, not only simply sensing the print density but also verifying the print can be effected relatively easily.

For example, there has been a case where even if the information is not printed at all due to a break, a tear, or a jam in the ink ribbon, the abnormality in the ink ribbon cannot be sensed. In such a case, by finding the defective print reliably through image matching check, recreation can be instructed.

In the radio IC raw card hopper 47, a backup plate pressed by a pressure spring 141 is provided so as to be movable up and down. On the backup plate 142, a large number of radio IC raw cards 143 are stacked horizontally. The radio IC raw card 143 can exchange data with an external unit by radio, and contains an IC memory, a CPU for controlling the IC, and radio communication means.

The radio IC raw cards 143 housed in the radio IC raw card hopper 47, are taken out one by one from the highest end by a take-out rubber roller 144 that rotates counterclockwise, and is superimposed on top of the print raw card 102 passed through the print surface scanner 46 at the juncture section. Specifically, the end of the transport path 136 is the juncture section where a pinch roller 145 is provided. The pinch roller 145 is designed to be pressed against or separated from the end of the transport path 136 by, for example, a plunger solenoid (not shown). Ahead of the juncture section, there is provided a stopper 146, which is also driven by a plunger solenoid 147, thereby providing open/close control of the transport path.

When the print raw card 102 and the radio IC raw card 143 join with each other from the top and bottom of the transport path 136, the pinch roller 145 is separated from the end of the transport path 136. After the two cards are held back by the stopper 146 and superimposed with each other completely, the pinch roller 145 is pressed by the plunger solenoid against the superimposed two cards. The stopper 146 is released, allowing the superimposed two cards to be sent to the two-type raw card melt bonding-together section 48.

The two-type raw card melt bonding-together section 48 thermally welds the two raw cards 102, 143 together, and comprises a heat roller 148 in which a heating element is embedded and a rubber roller 149. The two raw cards 102, 143 are integrated into one unit by heating and pressuring them with two rollers 148, 149.

In a case where before the thermal welding, the print raw card 102 has been judged to be defective in the verification of the print surface, the radio IC raw cards 143 are not taken out. Instead, a reject hopper 150 is started, thereby discharging the print raw card 102 into the reject hopper 50. At the same time, a print raw card 102 is taken out again and a print raw card 102 with the corresponding driver's license number is produced again.

The license card obtained by integrating two raw cards 102, 143 into one unit, is conveyed by a transport roller 152 to the radio IC encoder 49. The radio IC encoder 49 writes the necessary information into the license card and verifies it, and sends it to the next stage if no error is found. When an error is found as a result of verification, the transport roller 152 is reversed, and writing is done again into the license card. When the writing fails again, the license card is conveyed by a transport roller 154 to a reject flapper 155. Then, the reject flapper 155 starts, thereby storing it in the reject stacker 51. To store as many cards as possible in the reject stacker 51, cards must be prevented from standing straight. To do this, a backup plate 157 is supported by a coil spring 158 in such a manner that the backup plate 157 goes down due to the weight of cards. While the defective printed cards and defective written radio IC cards are collected in the separate stackers, they may be stored in the reject stacker only if they need not be separated.

When there is no abnormality as a result of radio IC verification, the good license card is conveyed as a completed card-like driver's license by a transport roller 159 to a discharge roller 160, which sends it to the slit conveyer 7. In FIG. 7, numeral 161 indicates a power supply section for supplying an operating power, 162 a control unit for controlling the entire apparatus, 163 an operator panel, and 52 a 3.5-inch magneto-optical disk unit for directly entering face images and the information to be written into an radio IC instead of transmission from the automatic reception apparatus 5.

Figure 8:
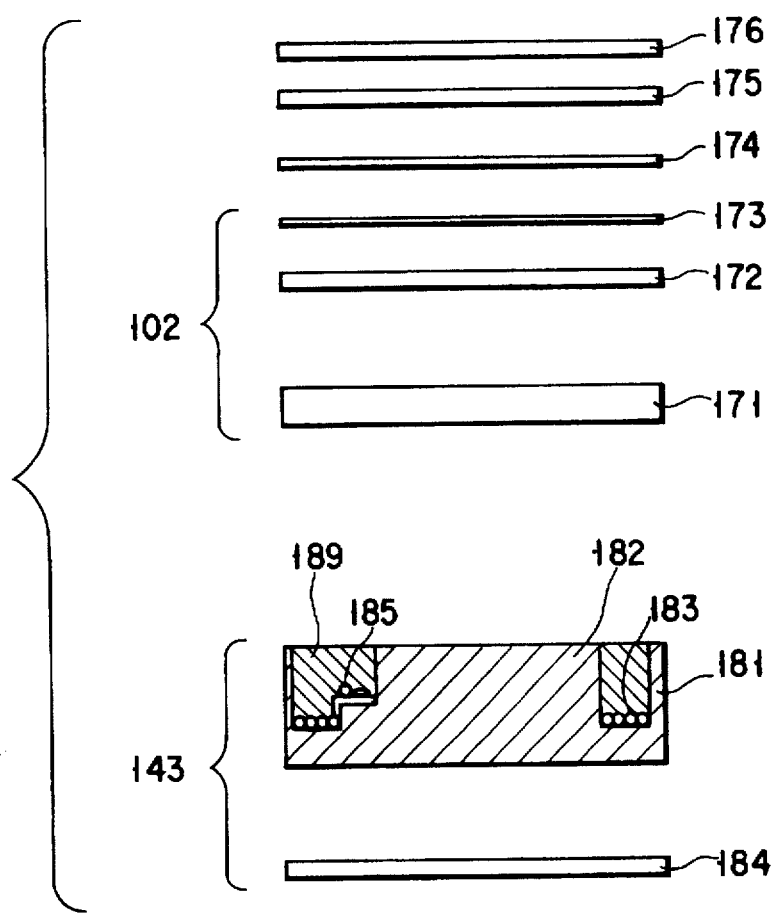
FIG. 8 is an exploded side view of the structure of the license.
Figure 9B:
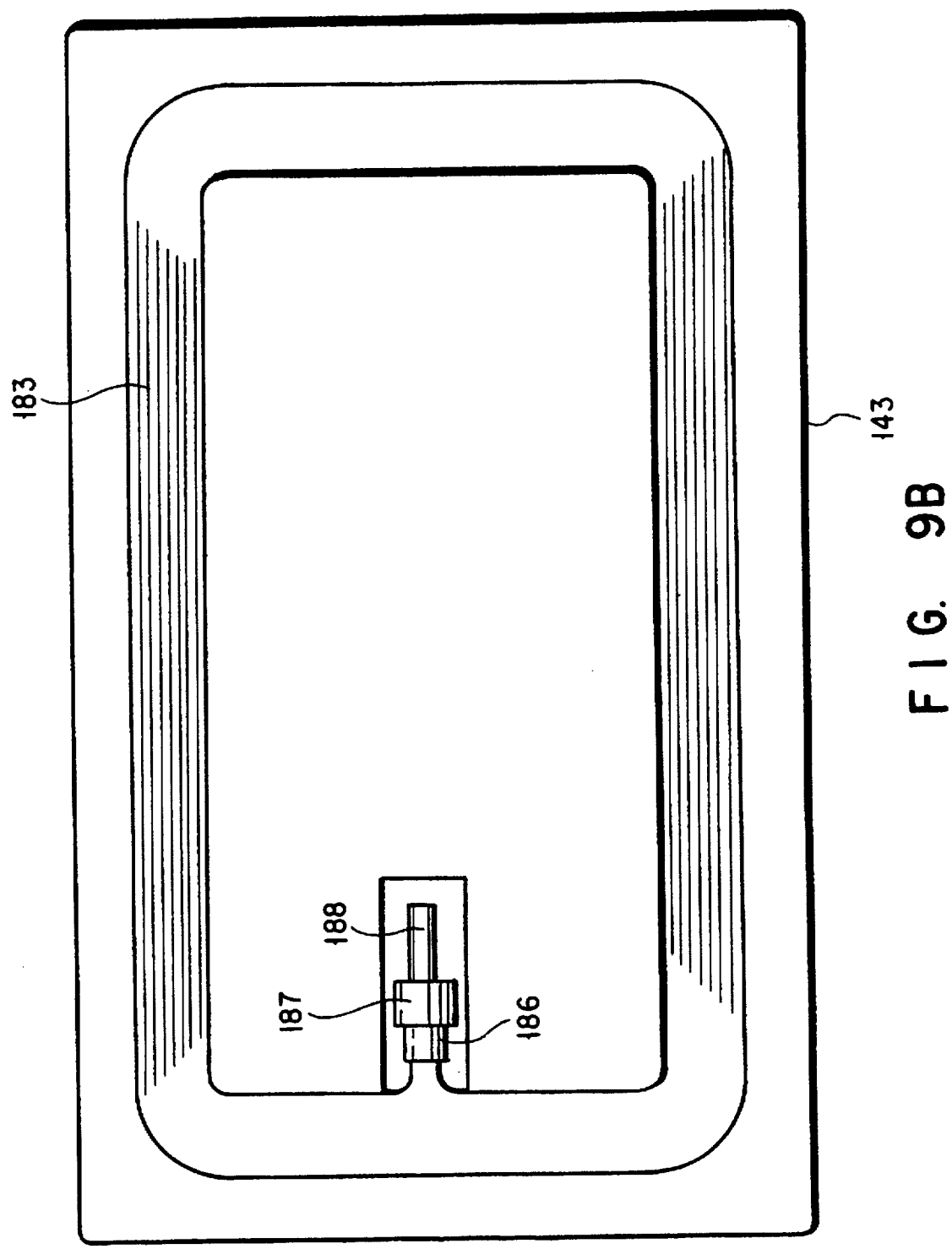
Figure 10A:
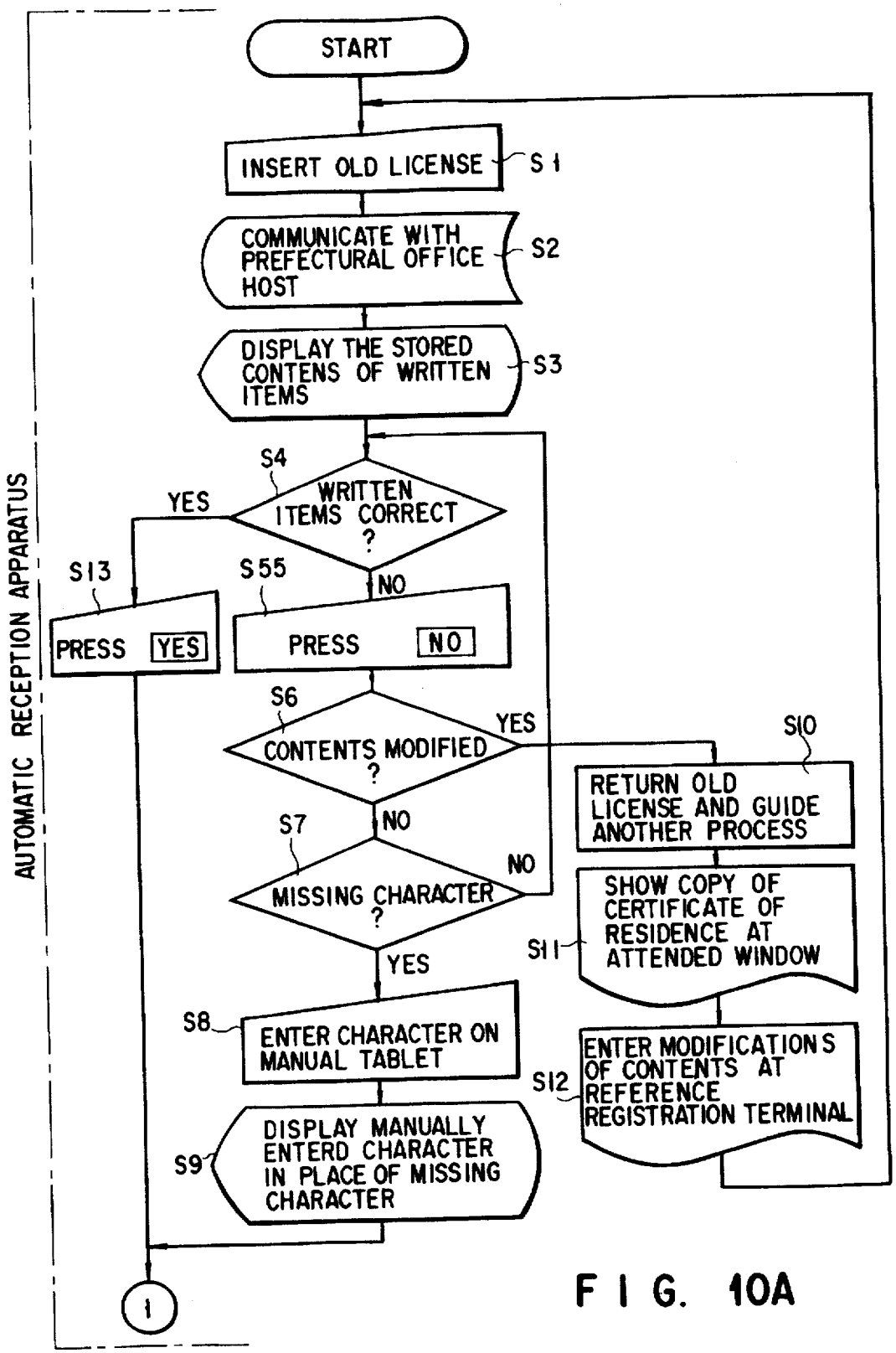
FIGS. 10A to 10D are flowcharts to help explain the automatic renewal operation of the licenses.
Figure 10B:
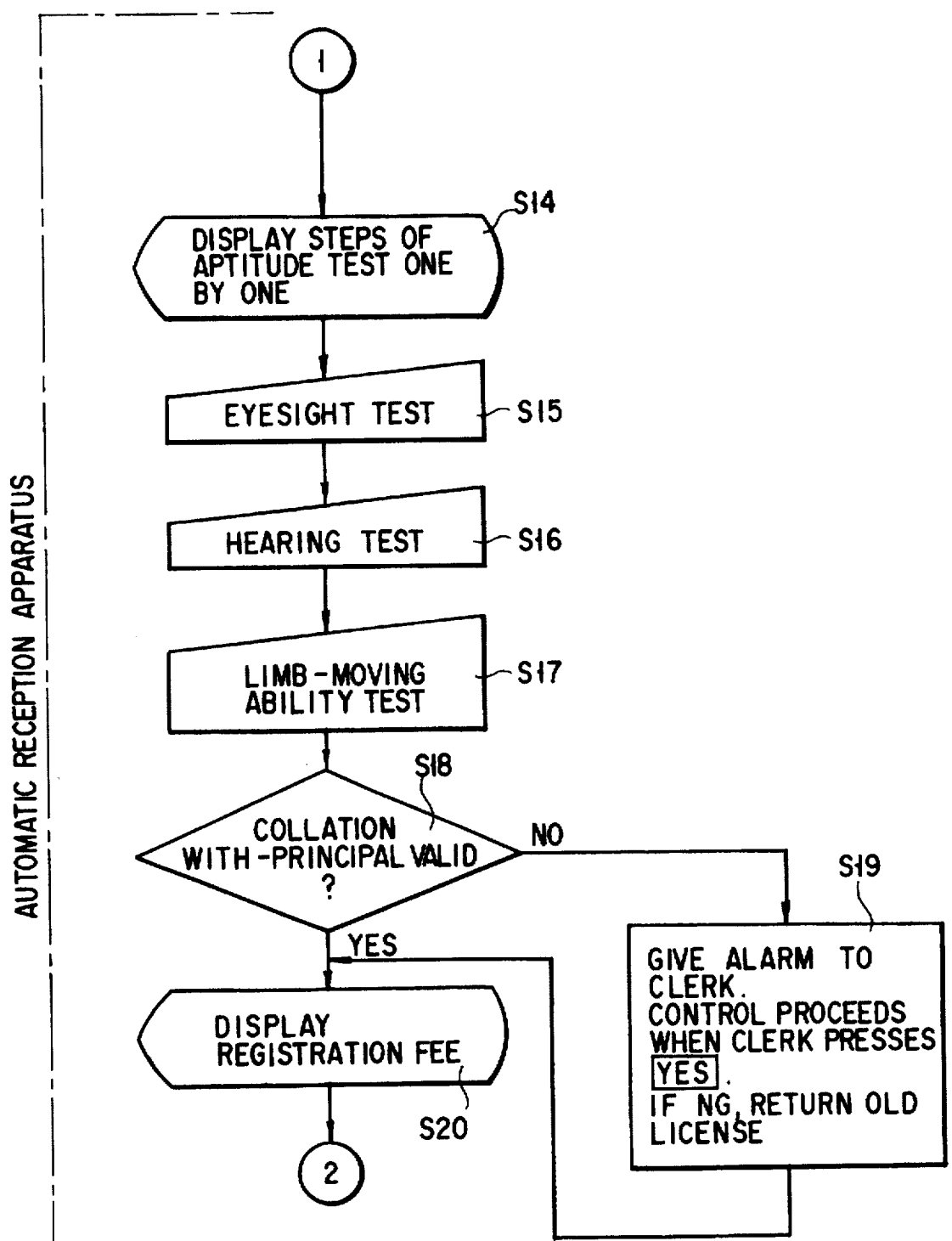
Figure 10C:
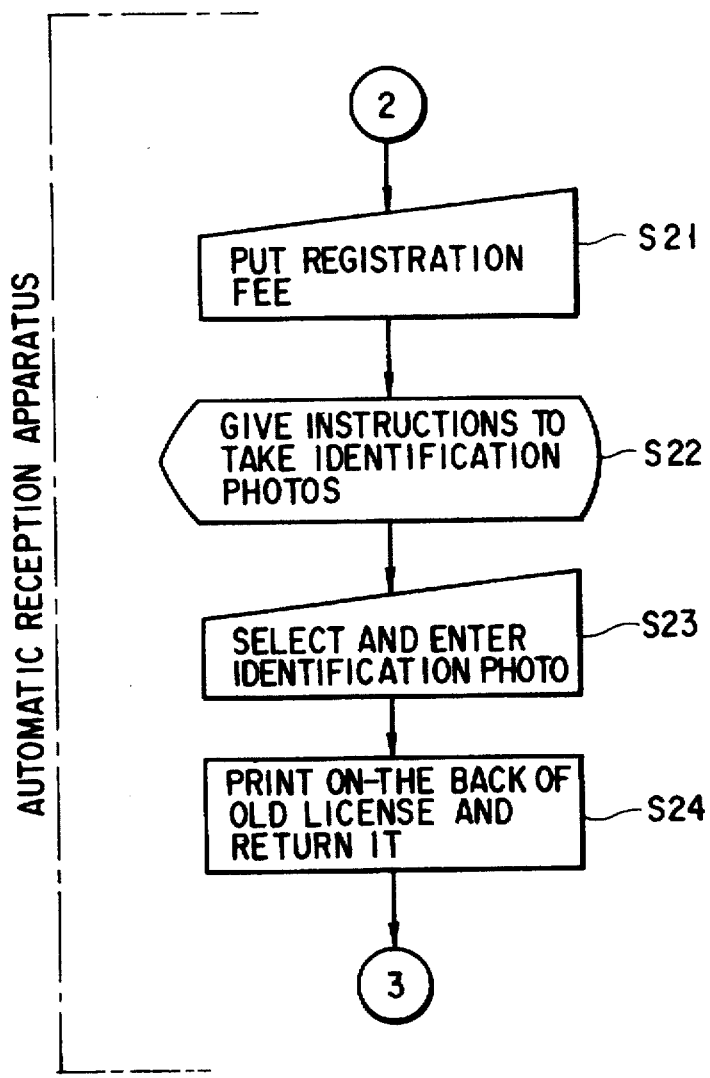
Figure 10D:
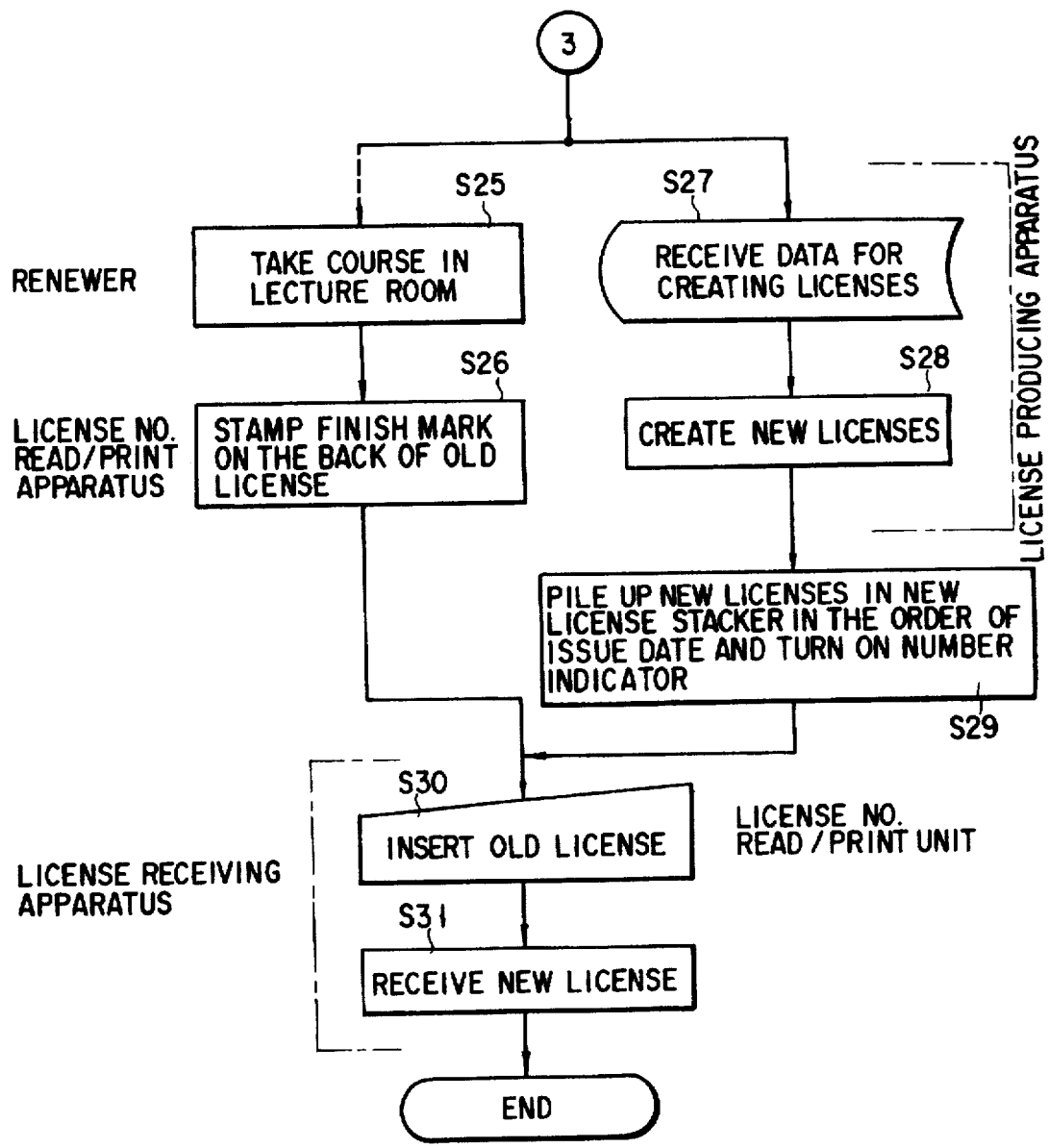

FIG. 8 and FIGS. 9A and 9B show the structure of a card-like driver's license according to the embodiment. Specifically, a print raw card 102 as a first card medium is formed by, for example, forming an image-receiving layer 172 and a form-separating layer 173 on the surface of a plastic support 171. As described earlier, on the form-separating layer 173, a print ink layer 174 for face image and written data by the 3-color thermal sublimation print section 41 and black-letter melt transfer print section 42, a light-resistance-improving ultraviolet-ray absorbing film 175 by the light-resistance-improving protective-film transfer section 43, and an ultraviolet hardening surface protective-film 176 by the surface protective-film application section 44 are formed in sequence. In FIG. 9A, numeral 177 indicates an identification photo and 178 represents the printed written data.

In a radio IC raw cards 143 as a second card medium, for example, a groove 182 is made in one face of a plastic support 181 by machining it, and a radio antenna 183 is wound into a loop and housed in the groove 182. On the other face of the support 181, a writing layer 184 is formed. In the central portion of the support 181, an IC board 185 is housed. On the IC board 185, there are provided a power rectification capacitor/diode section 186, a hardware logic (e.g., a radio communication circuit or a CPU) 187 formed on a one-chip water, and a FRAM 188 (ferroelectric substance memory). The groove 182 is filled with a filler 189.

Some radio IC cards contain batteries to transmit radio-waves into the distance. Since any battery has service life and the collection and disposal of dead batteries cost much, the magnetic-coupling batteryless power supply system is widely used for such radio IC cards as are used only in a short-distance transmission. In the system, power is also transmitted by radio, charging the internal battery, thereby operating the internal circuit.

As for memories, ferroelectric substance memories (FRAMs) are used which operate at low voltages at high speeds and retain the contents of storage even when power is turned off. This helps batteryless radio IC cards come in practice.

After the print raw card 102 is bonded or thermally welded with the radio IC raw card 143 of FIG. 8 into one unit, thermal sublimation printing and thermal melt printing could be effected on the image-receiving layer 172 of the print raw card 102. However, because the surface accuracy of the filler 189 in the radio IC raw cards 143 cannot be improved, and the filler differs from the other support 181 in material hardness, pressing the surface downward with the thermal print head cannot equalize the head touch pressure, resulting in print irregularities.

Even if measures have been taken against print irregularities, when the sufficiently strong light-resistance-improving ultraviolet-ray absorbing film 175 is applied by a heat roller, or when an ultraviolet hardening surface protective-film 176 is applied and then exposed to ultraviolet rays radiated from a mercury lamp, the internal IC section that cannot be heated or pressured will be damaged. Therefore, it is desirable that the radio IC raw card 143 should be formed into a license card under conditions where the effects of temperature and pressure are as small as possible.

For this reason, currently available radio IC cards have a simple bonding structure where a separately printed seal is adhered to it from above. In an attempt to peel it from the card, it could be peeled easily, raising a problem in terms of prevention of forgery. Since they are used in very limited circumstances and the printed items on the surface are simply preliminary items for confirmation, aiming principally at monitoring the entering and exiting of the renewer as well as his or her action history, a serious problem has not arisen.

With the license producing apparatus 6 of FIG. 7, after printing has been done on a single print raw card 102 and the print has been checked, the necessary data corresponding to the contents of the print is written in a radio IC raw card 143. When what has been written is checked and no abnormality is found, the license card is transported to the slit conveyer 7.

In this way, because the correspondence between two raw cards 102, 143 is checked in the apparatus and thereafter the data is written into the IC, there will be no difference in what has been compared. When the two raw cards 102, 143 are bonded with an adhesive that provides sufficient strength even at very low temperatures and pressures, there is no need to undesirably heat and pressure the internal IC section by printing or heat roller. This makes it possible to produce a highly reliable radio IC-card driver's license with the contents printed on its surface.

Hereinafter, the automatic driver's license renewal operation of the above-mentioned arrangement will be explained, referring to FIGS. 10A to 10D.

A renewer who has come to renew his or her driver's license goes into a reception box 4 of FIG. 2. The renewer sits on the chair 64 in front of the automatic reception apparatus 5 and inserts his or her old driver's license (radio IC card) into the license slot 65 in the license number read/print unit 21 (S1). The inserted old driver's license is taken in by the license number read/print unit 21, where the radio IC encoder 72 reads the contents of the radio IC (memory) and the license number read section 74 reads the license number on the surface.

The automatic reception apparatus 6 communicates with the host computer 34 on the basis of the read-out license number (S2). The contents stored in the radio IC include, for example, 1. name, 2. birth date, 3. family register, 4. address, 5. issue date, 6. validity period, 7. conditions of license, 8. license number, 9. type of license, 10. acquisition date, 11. blood type, 12. retina image, 13. bit image characters, 14. other necessary data items. Of the contents, what is written from items 1 to 10 is stored in the host computer 34 as master data.

In general modifications to the contents of the driver's license can be accepted at any police station. Since an on-line register terminal is not always provided in every police station, the accepted modifications are mailed to the driver's license center later on, where they undergo intensive batch processing. For people who have made modifications (generally, amounting to nearly 10% in three years), because the contents written on the surface and the contents stored in the radio IC have not been renewed, and only the master data has been renewed, the master data must be retrieved without fail (at the time of renewal).

Since the host computer 34 also stores administrative disposition of the owners of driver's licenses, history data about accidents etc., data as to whether renewal application should be accepted in terms of suspension or cancellation of driver's licenses, reference to the host computer 34 is indispensable. Furthermore, because the extension of validity period for excellent drivers to five years to be in effect in 1995 is allowed on the basis of violation and accident history, the host computer 34 must be referred to as well.

Next, what is written on the driver's license is displayed (S3) and the contents are checked (S4). If the contents are not correct (in the case of NO), it is checked whether or not the contents should be modified (S6). If no modification is made, it is checked whether or not there is any missing character (S7).

The host computer 34 generally stores data in the form of code data. Kanji characters are standardized recording to the JIS first and second standards. In the case of driver's licenses, however, a lot of special Kanji characters exceeding the range of these standards are used in names. As for the Japanese, such special Kanji characters can possibly be wrong characters in most cases, because many nonexistent Kanji characters have been handwritten by accident in the times of handwritten registration before computerization. Recently, the number or foreigners has been increasing and Kanji characters beyond the standards are often used for Chinese.

Of such characters, those frequently used are formed as external characters and their code data items are entered. Much less frequently used Kanji characters are not entered in the form of code, and are indicated on a terminal unit by flickering a blank to mean a missing character. Then, a character is directly written with a pen in the place corresponding to the indicated position in the license. This gives the person in charge a lot of trouble.

With this embodiment, a person who renews his or her driver's license for the first time, enters a character corresponding to the missing character on the manual tablet (S8). The character is stored in a radio IC in the form of a bit image character. The bit image character is displayed on the CRT display 23 (S9). Since the host computer 34 is not suited for dealing with bit images, bit images are stored in each driver's license locally in the form of images, thereby making the entire system automatic. Thus, the host computer 34 stores missing characters in the form of blanks.

Many people make modifications to the contents at the time of renewal of driver's licenses. Therefore, when the contents are changed at 86 (in the case of YES), the old driver's license is converted and a message for another process is displayed on the CRT display 23 (S10). The modifications to the contents are checked against a copy of the certificate such as the certificate of residence (S11). Then, the modifications to the contents are entered at the reference registration terminal (S12). Since at present, such a copy of a certificate is hard to read mechanically, the clerk makes modifications to the registration of the returned old driver's license, and then operates the automatic reception apparatus 5. In the future, if copies of certificates are given in electronic form, the automatic reception apparatus 5 will be able to modify the contents directly.

By those operations, the contents of the driver's license are displayed on the display 23 of the automatic reception apparatus 5 (S9) to allow the renewer to confirm the contents. In this case, what is displayed for confirmation is limited to the contents concerning items 1 to 10 stored in the host computer 34 and the dot images for missing characters, and what is stored in the radio IC of the license is normally not displayed.

When the contents are correct at step 84, and the renewer presses the YES key displayed on the display 23 at step S13, the contents of aptitude test in the next step are displayed (S14). The aptitude test includes eyesight, hearing ability, and limb-moving ability. Of these tests, the most strict one is an eyesight test or step S15.

The renewer looks into the eyesight test machine 25, and answers the eyesight test marks of circular patterns partially cut away, displayed one after another, saying "Up", "Down", "Right", or "Left" according to the position of the cutaway portion. In this case, to be doubly sure, the answer may be entered from the keyboard. Since doing so requires the renewer to take his or her eyes off the eyesight test machine 25, it is desirable that speech recognition techniques should be used. The reason for this is that in the course of the test, a retina image of the renewer is taken in and undergoes matching check with the retina image stored in the radio IC stored in the old driver's license.

Next, after the eyesight test has finished, a hearing test using the hearing test machine 26 (S16), and a limb-moving ability test using the limb-moving ability test machine 27 (S17) are carried out sequentially. In these tests, the representation on the display 23 and the speech from the speech guide unit 28 lead the renewer through the procedure.

For driver's licenses, replacing the identification photo and written data of one person with those of another person is the most serious problem. Until now, the clerk checks the renewer many times against the identification photo on the old driver's license and the photograph on the application form. A method of identifying a person on the basis of fingerprint patterns is well known. Because each person has a distinctive retina, the retina has recently been used to identify a person. To take in a retina image, a person has to look into a retina image input apparatus. The action is uncomfortable and troublesome to the person tested, and therefore this method has not spread widely yet. In renewal of driver's licenses, all the renewers have to undergo eyesight test of both their eyes. Therefore, it is possible to collect data on retina images and to spend sufficient time comparing the data on retina images with the retina image stored in the radio IC of the old driver's license. In this way, collation with the renewer is performed (S18).

Since part of the retina image might change due to accidents or illness, if so, an alarm is given to the clerk and the clerk compares the face of the renewer with the identification photo on the old driver's license. After having identified the renewer as true, the clerk presses the clear modification YES button to replace the retina image with the newly collected one, that is, change to the new retina image. If strictness is not required for the retina image, about 500 bytes of memory provide sufficient matching and thus is suitable for the system.

After all the aptitude tests have finished, a message to ask the renewer to pay the registration fee appears on the display 23 (S20). In this case, depending on a history of violation, either the 3-year validity period or the 5-year validity period is given, and either the simplified lecture or the full lecture must be taken. The registration fee differs between the two types of periods. When the fee is put into the paper money slot 70 and coin slot 69, the paper money processing unit 30 and coin processing unit 29 receive them, and return change, if any (S21). Then, the photographing of the renewer's face starts (S22).

In photographing the face, closed eyes accounting for most of the defective cards are the most significant bottleneck. Since the driver's license having a picture with the eyes closed cannot be used as a certificate, the clerk makes sure that the eyes are open. To photograph a lot of people one after another, the image at the moment the photograph was taken is displayed on the monitor display. The clerk looks at it and, if finding it defective, takes another photograph. Actually, however, the clerk cannot help overlooking defects. In a driver's license center, defects in the licenses for more than ten renewers were found every day. Since as long as both eyes are open, they are treated as good photographs, even if the renewer has been photographed with uncomfortable timing and complied about the picture, the renewer has to go around with the driver's license with the nasty identification photo until the next renewal.

With consecutive shots taken by the photographic camera 22 using a 3-plate CCD imaging element, not a single shot taken by a conventional silver halide photographic system, when the renewer sits up straight and presses the photo button, ten still pictures are stored in memory at intervals of 0.1 second. The face images stored in memory can be displayed on the display 23 with, for example, a message "Another X screens are left" in the lower part of the screen in such a manner that the face images can be selected in a manner as turned pages. Since blinks resulting in closed eyes take place several times a second at most, taking ten shots of the renewer's face in a second allows him or her to select a favorite one. If the renewer still dislikes them, another ten shots are taken from scratch.

Furthermore, the centering of the face image is also important. By using an autoframing function, the image is edited by software so that the face image is placed in the center of the image area. The face image thus determined is entered (S23).

Thereafter, the data written on the surface is read again, and the surface image data is superimposed with what is appearing on the display 23. The determined surface image data about the driver's license is sent to the hard disk unit 33, which stores it and transmits it to the license producing apparatus 6. The electronic face image and written data are transmitted as a surface image to the image file server 38, which stores it onto an optical disk. By storing data in the form of electronic images, the face images and be retrieved using the retrieval terminal unit 39 and checked against the applicant, when reissuing of the driver's license is requested because of loss.

Since the image file server 38 is suitable for storing images, when retina images and bit image characters unsuitable for storage in the host computer 34 are stored in the form of images, they are useful in reissuing driver's licenses. Since storing images generally requires a large memory capacity, a very large file capacity is required unless image compression is used. At present, various standardization efforts have been made for full color image compression. Because up to 20-fold image compression causes little deterioration of the picture quality, this technique can be used practically. File capacity can be reduced by such image compression technology.

After the surface image has been determined, the thermal transfer print section 81 prints the issue date serial number (which is the reception serial number of the new driver's license), the course division (simple, full), the renewal procedure date postponement on the back of the old driver's license previously entered. The radio IC encoder 72 writes the above three data items in the radio IC. Thereafter, the old driver's license is returned to the renewer (S24), who is then instructed to go to the lecture room 11.

After the lecture, the renewer inserts the old driver's license into the license number read/print apparatus 12 installed in the lecture room 11. The driver's license number read/print apparatus 12 prints "Finished" on the back of the old driver's license and also writes data indicating "Finished" in the radio IC, and then returns the old license to the renewer (S26). The license producing apparatus 6 that has received the surface image of the license from the automatic reception apparatus 5, stores the surface image in the memory of the control unit 162 sequentially, and then starts to write data in the radio IC (S27, S28).

Because renewers come in separately and operate the automatic reception apparatuses 5 at their own pace, the time required to complete the card surface data differs from person to person. Transmitting those data items one by one in real time makes the channel crowded at peak hours. To avoid this, the surface data items created at the automatic reception apparatuses 5 are stored in the built-in hard disk units 33, and in response to the request of the license producing apparatuses 6, the surface data items are transmitted.

In the embodiment, two license producing apparatuses 6 are used. One of them functions as a master unit and the other as a slave unit. The master unit controls the entire system so that these two units and achieve a well-balanced operation.

The driver's licenses created at the license producing apparatuses 6 are stored on the slit conveyer 7. The issue date serial numbers of the completed driver's licenses are shown at the issue data serial number indicator lamp 56 of the license receiving apparatus 9 (S29).

The renewer who has taken the course and has "Finished" stamped on the old driver's license and data written into, inserts the old driver's license into the license slot in the license receiving apparatus 9, when the renewer's own number coincides with the displayed number at the indicator lamp 56 (S30). At the insert slot, the license read/print unit 57 of the same construction of FIG. 5 is provided. The license read/print unit 57 checks the driver's license for the license number and data about "Finished" with the radio IC encoder 71, and for the license number on the surface with the license read section 74. If there is no abnormality, the license number read/print unit 57 returns the old driver's license to the radio IC encoder again, and then writes data indicating "Renewed and Invalid" into the radio IC. On the back of the license, the unit prints "Renewed and Invalid" in large type using a red ribbon with the thermal transfer print section 81. Thereafter, the old driver's license is collected in the collect hopper. The license number read/pit unit 57 also operates the pickup unit 8, takes out the new driver's license from the slit conveyer 7, and releases it through a chute toward the license insert slot below (S31).

With such a configuration, driver's license renewal, which is handled almost manually and is very busy at peak hours, can be executed completely without human intervention. Therefore, only investment in equipment can improve the convenience of the users without an increase in manpower in terms of alleviation of congestion and extension of renewal procedure time. The advantage of adding a radio IC to the driver's license has not been explained yet. The best advantage ocurs in creating violation tickets while enforcing traffic rules. At present, looking at the data written on the surface of the driver's license, a police officer writes it down on a violation ticket. At night, in a dark place, it is hard to read the driver's license and it is time consuming while trying not to make a mistake. In contrast, with all the written data stored in the radio IC of the driver's license, by placing the license close to the portable terminal unit and operating the specific buttons, the terminal unit drives the built-in printer, which then prints out a violation ticket including all the written data. This speeds up the processing reliably.

Some IC cards are of a contact type. Since there is a possibility that the contact may break or rust during use of the driver's license, it is desirable to use a fully-sealed noncontact radio IC card.

There is a slight possibility that the host computer 34 in the driver's license center will go down and take a long time to repair. Should this happen, at present, the clerk stamps a renewal application date postponement mark on the back of the driver's license and the renewer has to come again later.

Then the clerk combines a card with a renewer's identification photo directly taken on the camera to produce a correct driver's license. Alternatively, a driver's license is produced by indirect photography using the identification photo stuck on the application form. In the case of the present system, however, in the magneto-optical disk of the license producing apparatus 6, the renewer's identification photos and the written data items read from the radio IC are just stored in sequence (the license cannot be issued because the renewer's administrative disposition is unknown). As soon as the computer 34 has recovered, the data items stored in the magneto-optical disk 52 are taken out and the contents checked through communication with the computer 34. By changing the items to be modified and creating a driver's license at the license producing apparatus 6, the driver's license will be delivered by mail later and therefore the renewer can receive the driver's license with his or her favorite identification photo.

When the number of people who need not receive their driver's licenses on the spot increases, for example, many reception boxes 4 shown in FIG. 2 may be installed in various places as are cash dispensers at stations, and the surface images created there may be transmitted to the license producing apparatuses in the driver's license center via communication channels. Alternatively, a magneto-optical disk is installed in the automatic reception apparatus, and data is stored in the magneto-optical disk, which is collected periodically and inserted directly into the license producing apparatus in the driver's license center, thereby producing driver's licenses. As mentioned, there are various variations in the system that can be selected.

When the address and name in the items written on the renewer's driver's license can be read mechanically, various application forms (such as application forms in the public office, written requests, or application forms for home delivery) written almost every day in our daily life need not be handwritten if data about telephone number and sex is added to the other items, and if a portable terminal unit that reads the contents of the radio IC card driver's license is installed. This will improve the convenience of the users.

Introduction of such a unit can cause the serious problem of allowing personal data to be taken out by anybody. To avoid this, it is necessary that the contents of memory should be divided strictly to define a security area, and a guard should be set to allow access to the security area in the case of renewal of driver's license.

As explained above, the embodiment produces the following effects.

(1) Fully automated driver's license renewal alleviates congestion at peak hours. In addition, extension of renewal application time and an increase in the number of machines (e.g., automatic reception apparatuses only) improve the convenience to renewers of driver's licenses, (2) By obtaining a retina image differing distinctively from person to person as identification data, it is possible for automated identification to identify a person more accurately than conventional manual identification.

(3) By allowing the renewer to select his or her favorite identification photo in a relaxed atmosphere and then creating a card surface image using the selected photo, it is possible to prevent the renewer from continuing to have a bad feeling over the identification photo after completion of the driver's license.

(4) Because the steps of printing data including an identification photo on the surface, applying a protective film, and hardening are carried out separately from the radio IC card, driver's licenses with clear photos covered with hard protective films can be produced.

(5) Because the steps of printing data including an identification photo on the surface, applying a protective film, and hardening are carried out separately, the function can be expanded by making a separate circuit producing apparatus that needs no radio IC and adding a radio IC adapter unit to this apparatus.

(6) Because only the print raw cards which passed the surface print verification and number check are added with radio IC raw cards for additional functions, driver's licenses can be produced without wasting expensive radio IC raw cards, while assuring a correct matching.

(7) By writing data into the radio IC and printing on the back of the license reliably in every step, a check during in each step is assured. Should trouble arise, the clerk can deal with the problem properly on the basis of what is printed on the back.

(8) By storing image data (e.g., retina images or missing dot images) unsuitable for storage in the host computer into the radio IC, quick reliable response is assured and the building of a system that applies no load to the host computer is enabled.

(9) Even when the renewer had not found the driver's license card defective until he or she received it, the driver's license can be produced again by specifying the license number and retrieving the surface image data from memory. Therefore, such a problem can be dealt with quickly without giving trouble to the renewer.

(10) Because the entire system operates on the basis of the old driver's license, this eliminates use of exchange tickets, course tickets, and application forms, and therefore enables paperless management and reduces a waste of expenses.

(11) Because application forms are not necessary, this saves the renewer from filling in the form.

(12) Because the driver's license image can be automatically entered into the image file server, a person can be identified easily for reissuing a lost driver's license. Retina images are also stored in the image file server in image data form, and use of these images assures a reliable check of persons.

While in the embodiment, producing driver's licenses automatically has been explained, the present invention is not limited to this. For instance, the invention may be applied to other certificates with identification photos, such as personal identification cards, called ID cards, or entrance certificates for factories.

What is claimed is:

1. An automatic reception apparatus for renewing an identification card with a storage section, comprising:

identification number input means for inputting an identification number of an old identification card including a retina image of an owner;

eyesight test means for testing an eyesight of the owner of said old identification card, having a retina image photographing device, wherein the retina image photographing device comprises retina image photographing means for photographing the retina image of said owner, while the eyesight test means tests the eyesight of said owner; and judging means for judging whether the owner is genuine by collating the retina image included in said old identification card with a retina image supplied from said retina image photographing means.

2. The automatic reception apparatus according to claim 1, further comprising:

photographing means for photographing a plurality of face images of said owner; and face image selecting means for selecting one of the plurality of face images photographed by the photographing means.

3. The automatic reception apparatus according to claim 1, further comprising:

communication means for communicating with a host computer provided outside said automatic reception apparatus;

registration data input means for receiving the registration data corresponding to said identification number supplied from the identification number input means, from said host computer via said communication means; and changing means for changing the registration data inputted.

4. A card issuing apparatus which is connected to a host unit and issues cards, comprising:

aptitude testing means for performing an aptitude test for an applicant;

photographing means for photographing an image of the applicant;

identification input means for inputting identification information about the applicant;

data receiving means for receiving data items about the applicant to be written on a first card from the host unit based on the identification information inputted from the identification input means;

printing means for printing on the first card the image of the applicant photographed by the photographing means and the data items about the applicant to be written on the first card received from the host unit;

check means for checking whether a print quality of the first card printed at the printing means is acceptable;

laminating means for, when the check means has judged that the print quality of the first card is acceptable, laminating a second card containing a memory different from the first card printed by the printing means and the printed first card to produce a laminated card; and storage means for storing the data items about the applicant received by the data receiving means into the memory of the laminated card.

5. A card issuing apparatus which is connected to a host unit and issues cards, comprising:

aptitude testing means for performing an aptitude test for an applicant;

photographing means for photographing an image of the applicant;

identification input means for inputting identification information about the applicant;

data receiving means for receiving data items about the applicant to be written on a first card from the host unit based on the identification information inputted from the identification input means;

printing means for printing on the first card the image of the applicant photographed by the photographing means and the data items about the applicant to be written on the first card received from the host unit;

protective-film forming means for forming a protective film on a surface of the first card on which a print image is printed by the printing means;

check means for checking whether the first card on which the protective film is formed at the protective-film forming means is acceptable;

laminating means for, only when a check result of the check means has shown that the first card is acceptable, laminating the first card on which the protective film is formed at the protective-film forming means and a second card containing a memory different from the first card to produce a laminated card; and writing means for writing at least a face image and the data items about the applicant received by the data receiving means into the memory in the laminated card.

6. The card issuing apparatus according to claim 5, wherein the check means includes:

reading means for optically reading the print image printed on the surface of the first card and supplying image data corresponding to the print image;

character recognition means for recognizing characters printed on the surface of the first card based on the image data supplied from the reading means, and supplying a recognition result;

reference image data input means for inputting reference image data on the first card surface corresponding to the recognition result supplied from the character recognition means; and comparison means for comparing the reference image data with the image data supplied from the reading means, and supplying a recognition result.

7. The card issuing apparatus according to claim 5, wherein the writing means further comprises a radio transmitter-receiver and verifying means, and wherein the second card contains a radio transmitter-receiver, data corresponding to the face image and characters stored in the memory are transferred by radio from the second card to a radio transmitter-receiver in a certification card producing apparatus, and the radio transmitter-receiver and verifying means verifies the data transferred.

8. The card issuing apparatus according to claim 6 further comprising memory writing means for writing into the memory a data item corresponding to a comparison result of the comparison means.

9. A card issuing apparatus which is connected to a host unit and issues cards, comprising:

photographing means for photographing an image of an applicant;

identification input means for inputting identification data items about the applicant;

receiving data means for receiving data items about the applicant to be written on a first card from the host unit based on the identification data items inputted from the identification input means;

printing means for printing on the first card the image of the applicant photographed by the photographing means and the data items about the applicant to be written on the first card received from the host unit;

check means for checking whether a print quality of the first card printed at the printing means is acceptable;

laminating means for, when the check means has judged that the print quality of the first card is acceptable, laminating the printed first card and a second card containing a memory different from the first card to produce a laminated card; and storage means for storing the data items about the applicant received by the data receiving means into the memory in the laminated card.

10. The automatic reception apparatus according to claim 1, further comprising:

hearing testing means for testing a hearing of the owner.

11. The automatic reception apparatus according to claim 1, further comprising:
   audio guiding means for providing audio instructions to the owner to guide the owner through a license renewal procedure.

12. The automatic reception apparatus according to claim 10, wherein the hearing testing means includes a speaker and the speaker is capable of collecting a speech of the owner.

* * * * *